UNITED STATES PATENT OFFICE.

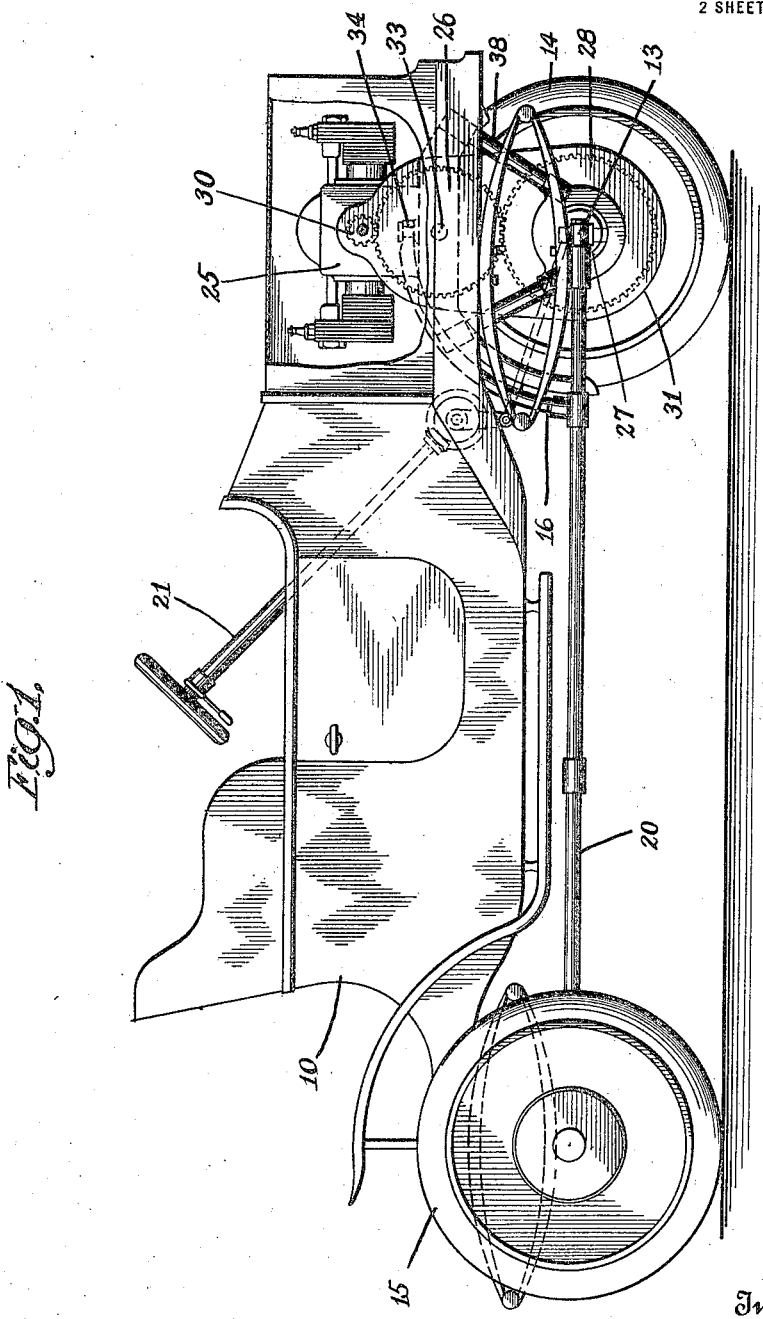

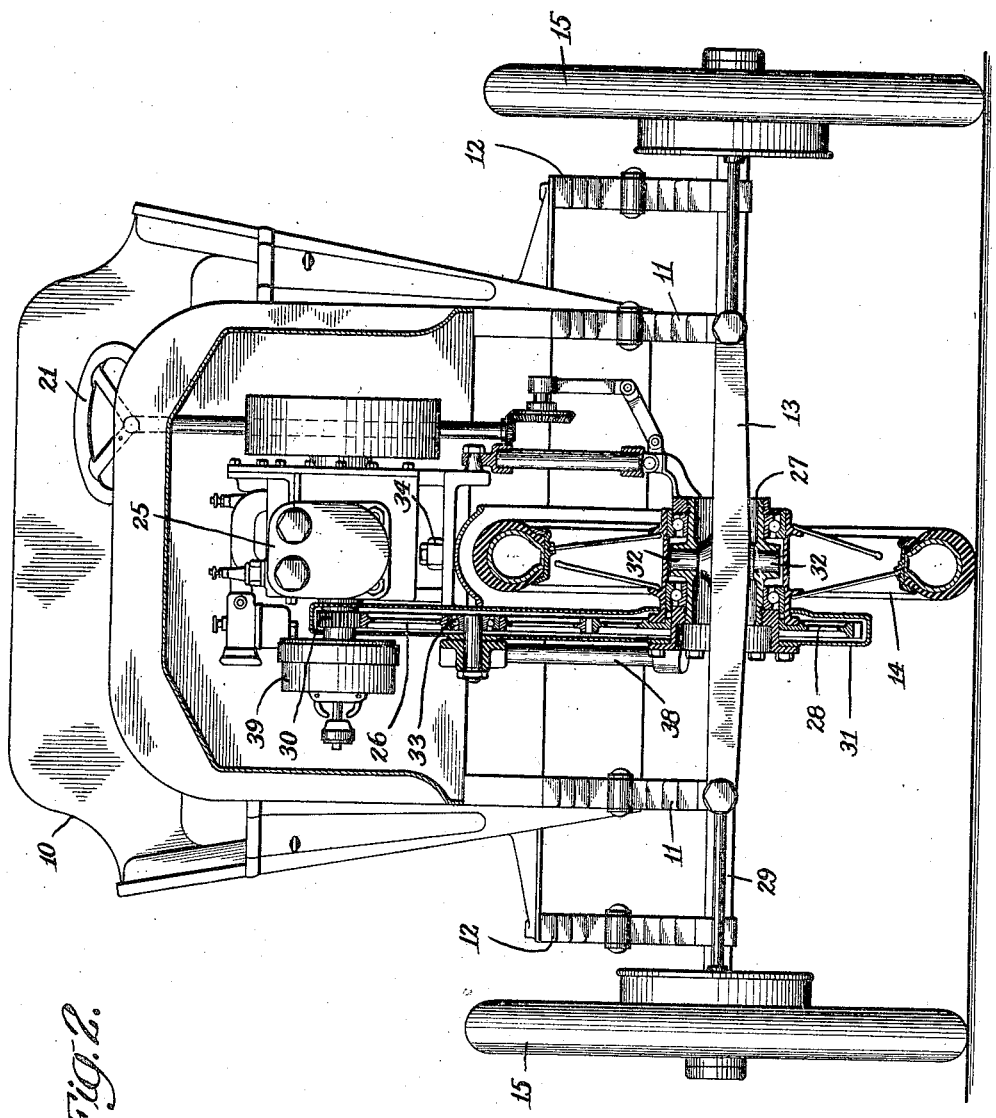

ALDEN E. OSBORN, OF NEW YORK, N. Y.

MOTOR VEHICLE.

1,423,731.   Specification of Letters Patent.   Patented July 25, 1922.

Application filed February 21, 1921. Serial No. 446,917.

*To all whom it may concern:*

Be it known that I, ALDEN E. OSBORN, a citizen of the United States of America, and a resident of New York, county of the Bronx, and State of New York, have invented certain new and useful Improvements in a Motor Vehicle, of which the following is a specification.

This invention relates particularly to a type of three wheeled self propelled vehicled in which a single wheel is employed as both traction and steering wheel. It is somewhat similar in general type to the vehicle disclosed in my patent for a motor vehicle, No. 712,001 dated October 28, 1902, in that the propelling motor is supported by framing which is movable with the traction wheel when the same is turned about its pivotal mounting to steer the vehicle, and also somewhat resembles the vehicle of my co-pending application for a motor vehicle, Serial No. 399,107, filed July 26, 1920, because of the fact that the motor is carried above the traction wheel. It, however, possesses certain advantages over these prior inventions and certain new and novel features that will be hereinafter described and claimed. Thus in my present invention the propelling motor is mounted on the frame connected with the pivoted wheel support in such a way that the supporting track shown in my patent just referred to has been eliminated and it is in a very convenient and accessible position while the power is, unlike in my above referred to application, transmitted to the wheel without the need of universal joints or other devices to permit of the wheel being slued with respect to the motor when steering the vehicle.

In the accompanying drawings I have, for the purposes of disclosure, illustrated my invention in one form only but would have it understood that it is susceptible of embodiment in other forms without departure from the true spirit and scope of the invention as defined in the appended claims. In these drawings:

Figure 1 represents a side elevation of a motor vehicle embodying the various features of my invention, and Figure 2 represents a partial sectional front elevation of the motor vehicle of Fig. 1 taken on a line adjacent to the front axle.

Similar numerals of reference indicate similar parts in both figures.

Referring to Fig. 1 it will be noticed that the body 10 is shown as of the passenger carrying type and is supported on springs 11 at the front and spring 12 at the rear although it will be readily understood that the type of body and method of mounting the same may be changed. It will also be noticed that an underframing 20 is provided to connect the front axle 13 with the rear axle 29 (see Fig. 2) which is carried by the wheels 15 but, of course, the usual arrangement of fastening this framing to or combining it with the body can be employed if preferred. In order to steer this vehicle I have shown the customary wheel steering gear 21 which is connected to the pivoted wheel support 27 to oscillate the wheel about its vertical axis for steering by any suitable means. The wheel support 27 carries the frame 38 which is designed to support the propelling motor or engine 25 that is carried over the traction wheel 14 or approximately over the same. As the weight of this engine or motor would be a considerable distance above the wheel support and as the torque would also tend to turn this engine about the axle with considerable force a frame member 16 is provided to steady these parts. This member 16 is pivotally attached at 34 to the frame 38 with this pivot is line with the axis of said support's pivotal mounting on the axle 13 and is also attached to the main or body frame 20 so that it braces the motor framing against rotation around the axis of the traction wheel. In order to transmit the rotation of the motor to the traction wheel I have provided a pinion 30 on the engine shaft, an intermediate gear 26 rotatably mounted on the motor frame 38 and meshing with said pinion and a gear 28 on the hub of the traction wheel and meshing in turn with this intermediate gear wheel. These gears are preferably enclosed in an oil tight casing 31 and are shown by dotted lines in this figure as they would normally be concealed from view. It will be readily understood that if it is desired a simple chain drive can be employed between the engine and the traction wheel with a sprocket on the engine shaft and wheel hub or that other modifications in the method of transmitting the power can be made. The detailed construction of the power transmitting mechanism and of the method of mounting the wheel 14 is more clearly shown in Fig. 2. In this figure the method of mounting the wheel support 27 on the pins 32 attached to the axle 13 is clearly shown as well as the arrangement of the driving gears 30, 26 and 28 and method of carrying the bearing 33 for the gear 26 on the frame 38. This figure also shows a transmission gear 39 of the planetary type which is mounted on the engine shaft and operates as usual to connect, at different speeds or in different directions in relation thereto, the sprocket or gear 30 thereon with the shaft. This transmission gear may obviously be of other types than the planetary type and may be omitted altogether if an electric motor instead of the internal combustion engine shown were used to propel the vehicle. In order to control the action of the engine and transmission gear the connections to these parts would have to be such that they would allow of the oscillation of the engine with the wheel when steering while not interfering with their action. In order to enable this to be done these connections could be made by means of the well known Bowden wire systems or by several methods that are obvious to those skilled in the art. When an electric motor is employed in place of the internal combustion engine shown, it would be connected to the batteries and controller on the vehicle body by means of suitable flexible conducting cables.

Having thus described my invention, I claim as new and desire to secure by Letters Patent—

1. In a motor vehicle, the combination of a traction wheel, a support for said wheel about which said wheel can rotate, an axle on which said support is pivotally mounted, a propelling motor, means for transmitting the rotation of said motor to said traction wheel, means for supporting said motor connecting with said wheel support, and means for steadying said motor having a pivotal connection with the supporting means thereof above said traction wheel and with the pivot's axis substantially in line with the axis of said support's pivotal mounting.

2. In a motor vehicle, the combination of a traction wheel, a suport for said wheel about which said wheel can rotate, an axle on which said support is pivotally mounted, a propelling motor, means for transmitting the rotation of said motor to said traction wheel, means for supporting said motor from said wheel support, and means for steadying said motor comprising a frame member having a pivotal connection adjacent to said motor and above said traction wheel and with the pivot's axis substantially in line with the axis of said support's pivotal mounting on said axle.

3. In a motor vehicle, the combination of a frame, a traction wheel, a support for said wheel about which said wheel can rotate, an axle on which said support is pivotally mounted, a propelling motor, means for transmitting the rotation of said motor to said traction wheel, means for supporting said motor, substantially above said traction wheel, from said wheel support, and means for steadying said motor comprising an extension of said frame having a pivot joint above said traction wheel and with its axis substantially in line with the axis of said support's pivotal mounting on said axle and connections between said joint and said motor.

4. In a motor vehicle, the combination of a frame, a traction wheel, a support for said wheel about which said wheel can rotate, an axle on which said support is pivotally mounted and having connections to said frame at each side of said support, a propelling motor, means for transmitting the rotation of said motor to said traction wheel, means for supporting said motor, substantially above said traction wheel, from said wheel support, and means for steadying said motor comprising an extension of said frame having a pivot joint above said traction wheel with its axis substantially in line with the axis of said support's pivotal mounting on said axle and connections between said joint and said motor.

5. In a motor vehicle, the combination of a traction wheel, a support for said wheel about which said wheel can rotate, an axle on which said support is pivotally mounted, a propelling motor, means for transmitting the rotation of said motor to said traction wheel, and means for supporting said motor, substantially above said traction wheel, from said wheel support whereby said motor and said support oscillate together when said support is swung about its pivotal mounting to steer the vehicle.

6. In a motor vehicle, the combination of a frame, a traction wheel, a support for said wheel about which said wheel can rotate, an axle on which said support is pivotally mounted and having connections to said frame at each side of said support, a propelling motor, means for transmitting the rotation of said motor to said traction wheel, and a motor supporting frame mounted on said wheel support for supporting said motor, substantially above said traction wheel, whereby said motor and said support oscillate together when said support is swung about its pivotal mounting to steer the vehicle.

In witness whereof, I have hereto set my hand this 18th day of February, 1921.

ALDEN E. OSBORN.